July 1, 1930.   C. E. SULLENBERGER   1,769,656
BAND SAWING AND JIG SAWING MACHINE
Filed March 11, 1929   2 Sheets-Sheet 1

INVENTOR
C. E. Sullenberger,
BY
John M. Spellman
ATTORNEY

July 1, 1930. C. E. SULLENBERGER 1,769,656
BAND SAWING AND JIG SAWING MACHINE
Filed March 11, 1929 2 Sheets-Sheet 2
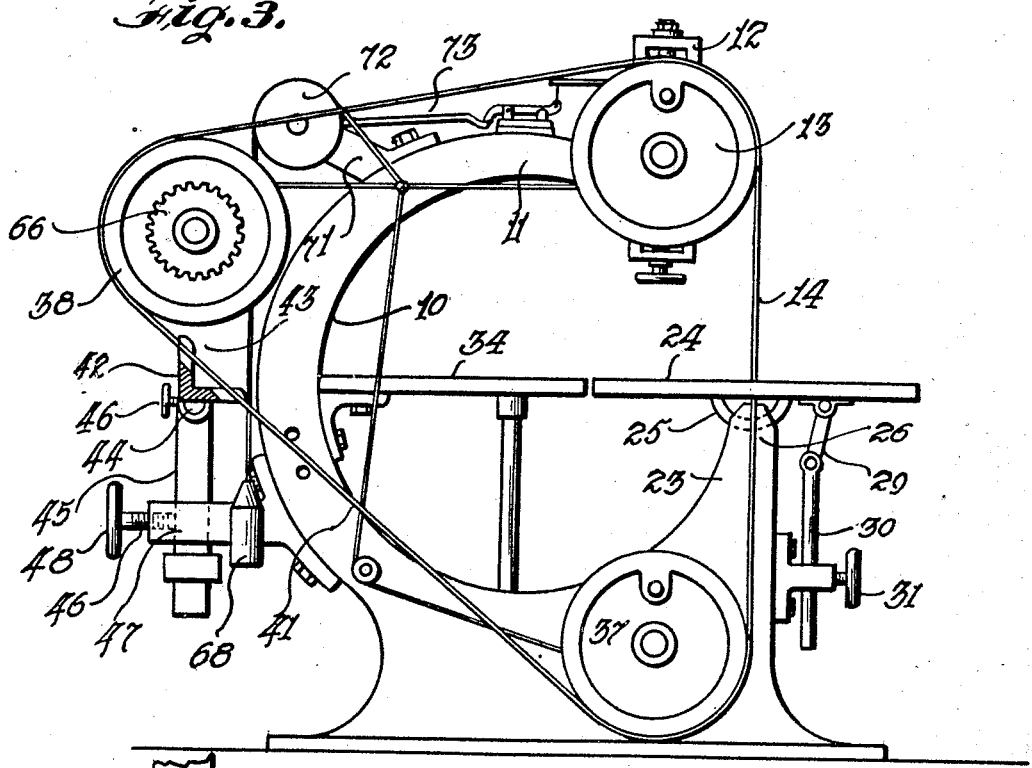
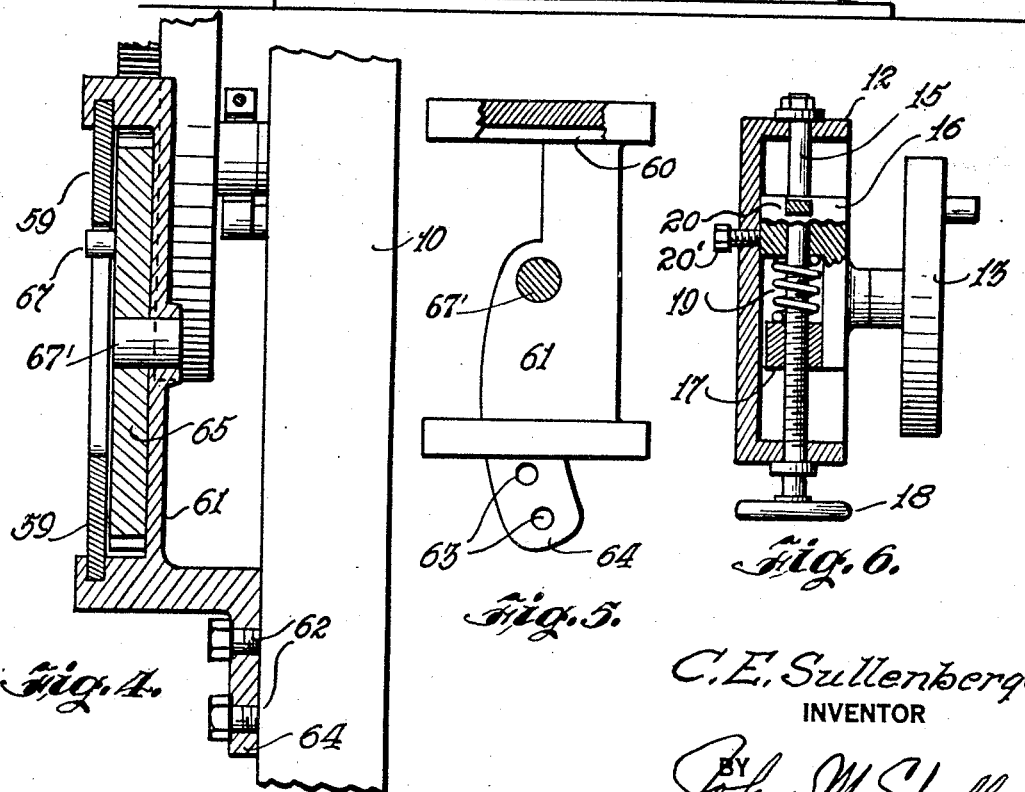
C. E. Sullenberger,
INVENTOR
BY John M. Spellman
ATTORNEY Patented July 1, 1930

1,769,656

UNITED STATES PATENT OFFICE

CHARLES E. SULLENBERGER, OF DALLAS, TEXAS

BAND-SAWING AND JIG-SAWING MACHINE

Application filed March 11, 1929. Serial No. 345,973.

This invention relates to sawing machines, and more particularly the invention has for its primary object the provision of a combination band sawing and jig sawing machine.

The present invention is an improvement over my Patent 1,757,785, granted May 6, 1930, and wherein there are included certain very important additions and alterations.

One of the important features of this present invention is the addition of certain parts, whereby the machine may be converted from a band sawing machine to a jig sawing machine, such change capable of being made in a few minutes.

Another very important feature of this invention is the improved automatic safety brake means, whereby the machine is automatically stopped in the event a saw blade should be broken.

A further object of the invention is that by its construction and arrangement, two operators can use the same machine and the same saw blade and perform simultaneously two separate and distinct kinds of work and without interfering with each other.

Figure 1:
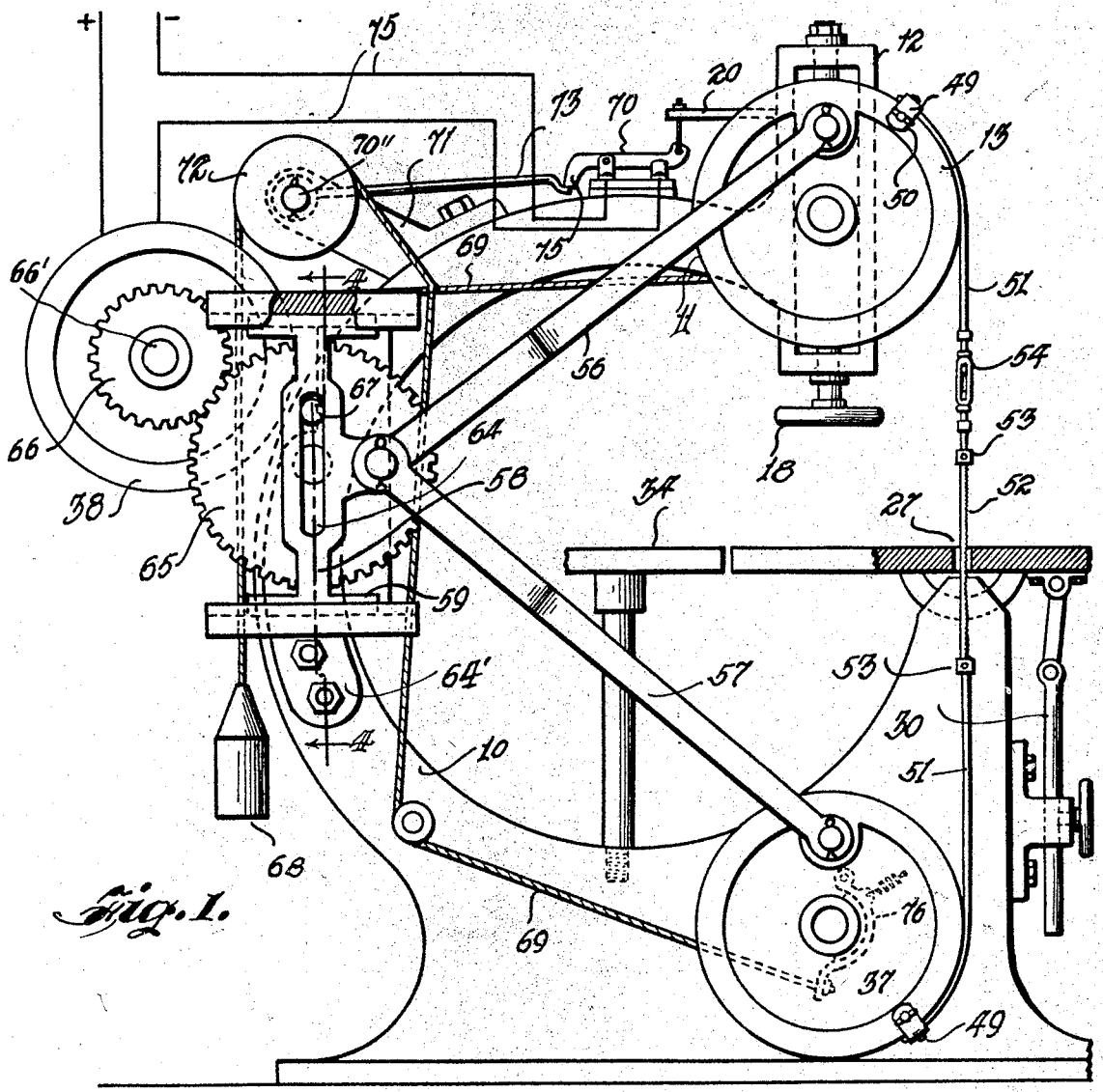
Figure 2:
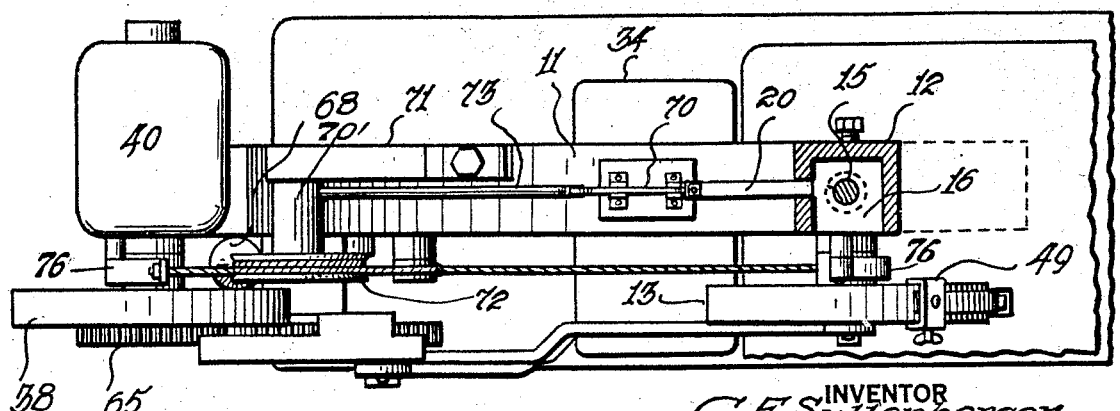

Other minor yet important objects of the invention will become apparent from a perusal of the following description, taken in connection with the accompanying drawings and wherein:

Figure 1 is a side elevational view of the machine, with the jig saw in operable position, Figure 2 is a top plan view partly in horizontal section, Figure 3 is a view similar to Figure 1, but illustrating parts removed in the installation of the band saw, Figure 4 is an enlarged detail sectional view of Figure 1, the view taken on the line 4—4 thereof, Figure 5 is a detail view of the supporting member for the reciprocating element which operates the jig saw attachment, and Figure 6 is an enlarged detail view in transverse vertical section of the adjustable saw carrier.

Proceeding in accordance with the drawings wherein numerals are used to show the various parts of the machine, 10 indicates a substantially C-shape frame for the mechanism. The upper portion 11 of the frame is formed with the vertical extension 12 within which the carrier wheel 13 for the saw 14 is adjustably mounted in any preferred manner, for instance, by means of the screw 15. A block 16, upon which the wheel 13 is mounted, is loosely supported on the smooth end of the screw 15. A nut 17 is also threadedly engaged with the screw 15 for moving the block 16 by turning the small wheel 18 in tightening the saw in operable position.

Interposed between the nut 7 and block 16 is a spring 19 which is provided for the purpose of automatically shutting off the motive power through the member 20 and co-acting parts, hereinafter more particularly referred to.

The forward extension 23 at the lower portion of the frame is provided with an adjustable work table 24, with an arcuate mounting 25, disposed within a bifurcated portion 26 of extension 23. The table has a saw slot 27, and may be adjusted by the link 29, post 30 and screw 31.

The open frame 10 of the saw is also provided with a fixed table 34.

The portion 23 of the frame has journaled adjacent its base a carrier wheel 37, while a similar wheel 38 is journaled at the rear of the frame, as shown.

The shaft of the wheel 38 is provided with any suitable form of motor 40.

These wheels or carriers are of any preferred construction and of substantially the same diameter, such diameter being less than that of the wheels ordinarily used in a two-wheel saw support, and their arrangement prevents excessive strain on the saws.

Co-operating with the lower reach 41 of the saw, there is provided a miter box or work holder 42, having its angularly disposed walls slotted as at 43, for the passage of the saw blade. This box is pivotally mounted at 44 upon a post or standard 45 and held in adjustable position by clamp screw 46. The post 45 is also vertically adjustable in the bracket 47 and held by the screw 48.

The foregoing describes parts of the machine covered in the former application for United States Letters Patent and is repeated for the sake of clearness in obtaining a correct understanding of the improved parts which will now be given in detail.

The machine can be converted into a jig saw by an attachment comprising the clamp members 49 held in position by the screws 50. To each clamp member is fastened a strap 51 and the jig saw 52 is fastened to the straps by the members 53 and partially tightened by the turnbuckle 54. The screw 15 is afterwards rotated to procure the complete tightening desired before the saw is set in operation. A set screw 20' is advanced into the block to tighten the parts when the machine is used as a jig saw.

The jig saw is made to reciprocate vertically by means of the levers 56 and 57 pivoted to the wheels 13 and 37.

In Figure 1 it will be seen that the inner ends of these levers 56 and 57 are pivoted to opposite sides of a reciprocating element consisting of a link 58 which has T-shaped ends 59. These end portions of the link are seated to slide backwards and forwards in slots 60 provided in the supporting member 61.

The supporting member is secured to the frame 10 by the bolts 62, being inserted through the apertures 63 in the angular projection 64 of the member 61.

In the link 58 is provided a slot 64 for the purpose of connecting the motive power to reciprocate the link in the thrust and pull of the levers to rotate the wheels 13 and 37. It will be seen from Figure 1 that to the rear of the link there is a gear 65 mounted on a shaft 67' the gear in mesh with a drive gear 66. Gear 66 is carried on shaft 66' and the shaft 67' is journalled in frame 61. A pin 67 is eccentrically mounted on gear 65. Obviously, when the motor is in motion, the gear 65, by means of its pin 67, bearing against the sides of the slot 64, will cause the member 58 to move to the right and left. Thus through the levers 56 and 57 the wheels 13 and 37 carrying the jig saw will vertically reciprocate the saw.

In Figure 3 is shown the appearance of the machine with the jig saw attachment removed and the band saw in operable position. For this change it is only necessary to remove gear support 61 with the reciprocating element and gear 65. The jig saw 52 and straps are removed by unscrewing the clamps 49, and the levers 56 and 57 taken off. The band saw 14 is then put in position around the wheels including the wheel 38 and tightened to operable position by the screw 15.

The machine includes an improved means for cutting off the motive power and stopping immediately the mechanism. This arrangement comprises a weight 68 and cable 69 in connection with a knife switch 70. In addition there is provided a supporting leg 71, pulley 72, rod 73, and sleeve 70'. The sleeve, pulley and rod are rigid one with the other, the sleeve being loosely mounted on the shaft 70" and connected to the supporting leg 71. The switch 70 is pivotally connected at one end to the member 20 previously mentioned. The switch is connected in the electrical circuit wires 75 supplying power for the motor.

This automatic power shut-off operates as follows: When either of the saws are in operable position and the screw 15 rotated, the nut 17 bearing against the spring 19, moves the block 16 and wheel 13 to required height to tighten the saw. However, the tightening of the saw will not force the block high enough to throw the switch, but if for any reason the saw should break, the spring being under compression by the pull of the saw blade, will, should the latter part, move the block high enough to cause the member 20 to raise one end of the knife switch 70, whereupon the end 75 of the switch moves out of contact with the rod 73, and the rod 73 is moved upward by the pull of the weight 68. The pulley 72 is held against rotation by the rod 73, bearing against switch 70.

As the weight drops downwardly the cable 69 exerts a pull upon the brake member 76 on each of the wheels and stops the momentum thereof, the motive power having been previously cut off by the opening of the switch.

The operation of the machine will now be apparent for either the band saw or the jig saw attachment, it is believed, without further explanation.

While the details of construction for a practical operating embodiment of the invention are here shown, the invention is not restricted to such disclosure minutely, as considerable alterations and changes are possible in keeping with the appended claims.

What is claimed as new is:

1. In a device of the character described, in combination with band saw pulleys, an electric motor for producing movement of said pulleys to actuate the saw, normally inoperative brake means, means for tensioning the saw, a normally closed switch for said motor associated with said tensioning means and actuated on the breaking of the saw to open and cut off said motor, said brake means being automatically actuated by the opening of said switch to retard said pulleys, whereby the momentum of the wheels is stopped at the same time the motor is cut off.

2. In a device of the character described, in combination with saw conveying pulleys, a motor for producing movement of the pulleys to actuate the saw, a normally closed switch for controlling said motor, brake means for said pulleys held inoperative by said switch when in closed position, tensioning means for said saw, and means associated with said tensioning means and said switch for actuating said switch to automatically shut off said motor when a saw breaks, the said brake means for said pulleys being rendered operative on the actuation of said switch.

3. The combination with a band saw machine which includes three band saw pulleys, one of which is power driven, of means for converting the band saw machine into a jig saw machine, said means including a jig saw, means for supporting said jig saw from two of the band saw pulleys, gearing operated from the power driven pulley, a reciprocating cross head actuated by said gearing, and links extending from said cross head to each of the pulleys to which the jig saw is attached and eccentrically connected to said pulleys, whereby reciprocation of the saw is obtained on rotation of said power driven pulley.

4. The combination with a band saw machine which includes a main frame and three band saw pulleys, one of which is power driven, of means for converting the band saw machine into a jig saw machine, said means including a jig saw, means for supporting said jig saw from two of the band saw pulleys, an auxiliary frame detachably connected to the main frame adjacent the power driven pulley, a rotating element carried by said auxiliary frame operated from said power driven pulley, and carrying an eccentric, a cross head slidingly mounted in said auxiliary frame and operated by said eccentric, and links extending from said cross head to each of the pulleys to which the jig saw is attached and eccentrically connected to said pulleys, whereby reciprocation of the saw is obtained in rotation of said power driven pulley.

5. In combination with a band saw machine, which includes three band saw pulleys, one of which is power driven, of means for converting the band saw machine into a jig saw machine, said means including a reciprocating cross head separated by said power driven pulley, a jig saw, means for supporting said jig saw from two of the band saw pulleys, and links eccentrically mounted on and extending from the jig saw carrying pulleys to the cross head for producing reciprocation of said band saw.

6. The combination with a band saw machine which includes three band saw pulleys, one of which is power driven, of means for converting the band saw machine into a jig saw machine, said means including a jig saw, means for supporting said jig saw from two of the band saw pulleys, and links eccentrically connected to each of said jig saw carrying pulleys, and means including a reciprocating cross head for actuating said links from said power driven pulley, whereby the jig saw carrying pulleys are oscillated and the jig saw reciprocated.

In testimony whereof I affix my signature.

CHARLES E. SULLENBERGER.